United States Patent [19]
Lapp et al.

[11] Patent Number: 5,148,753
[45] Date of Patent: Sep. 22, 1992

[54] TRANSIT SYSTEM

[76] Inventors: Stephen P. Lapp, P.O. Box 261, Odessa, Ontario, Canada, K0H 2H0; Ronald F. van Huuksloot, 895 Old Colony Road, Kingston, Ontario, Canada, K7P 1S1; Peter E. Timan, R.R. #1, Sydenham, Ontario, Canada, K0H 2T0; Harry Skoblenick, 238 Fairway Hill Crescent, Kingston, Ontario, Canada, K7M 2B4

[21] Appl. No.: 433,448

[22] Filed: Nov. 13, 1989

Related U.S. Application Data

[63] Continuation of Ser. No. 333,748, Apr. 5, 1989, abandoned, which is a continuation of Ser. No. 165,313, Mar. 8, 1988, abandoned.

[30] Foreign Application Priority Data

Mar. 13, 1987 [CA] Canada ................................. 532042

[51] Int. Cl.$^5$ ............................................. B61B 13/12
[52] U.S. Cl. ..................................... 104/290; 104/292
[58] Field of Search ....................... 104/290, 291, 292; 318/38, 135, 687; 310/12

[56] References Cited

U.S. PATENT DOCUMENTS

| | | | |
|---|---|---|---|
| 857,651 | 6/1907 | Moller | 188/124 |
| 3,339,675 | 9/1967 | Bingham | 188/43 |
| 3,803,466 | 4/1974 | Starkey . | |
| 3,960,090 | 6/2976 | Maki et al. | 104/292 |
| 3,974,778 | 8/1976 | Black et al. . | |
| 4,061,089 | 12/1977 | Sawyer | 104/292 |
| 4,635,500 | 1/1987 | Ballantyne | 104/292 |
| 4,665,349 | 5/1987 | Matsuo . | |
| 4,709,639 | 12/1987 | Geais | 104/292 |
| 4,716,346 | 12/1987 | Matsuo . | |

FOREIGN PATENT DOCUMENTS

| | | |
|---|---|---|
| 0158114 | 10/1985 | European Pat. Off. . |
| 0160523 | 11/1985 | European Pat. Off. . |
| 2245629 | 4/1973 | Fed. Rep. of Germany ...... 114/292 |

Primary Examiner—Sherman Basinger
Assistant Examiner—Stephen P. Avila
Attorney, Agent, or Firm—Fleit, Jacobson, Cohn, Price, Holman & Stern

[57] ABSTRACT

A transit system is disclosed having a guideway, with the primary of a linear induction motor located at spaced intervals therealong. A train of vehicles is positioned to travel along the guideway and includes the secondary of the linear induction motor. The secondary extends along and between the vehicles in spaced relation with respect to the primary so as to encounter a magnetic field emanating from the primary to cause a thrust to be generated in the secondary. The secondary thereby provides an even distribution of the thrust along the frame, while reducing the loss of power when the train encounters corners and hills.

29 Claims, 12 Drawing Sheets

TRANSIT SYSTEM

This application is a continuation of application Ser. No. 07/333,748, filed Apr. 5, 1989, now abandoned which is a continuation of application Ser. No. 07/165,313, filed Mar. 8, 1988, now abandoned.

This invention relates to linear induction propelled vehicles.

A great deal of research and development has been carried out for adapting linear induction motors in transit vehicles.

The linear induction motor commonly comprises two portions, namely the primary and the secondary, the primary having windings which generate an electric field. In transit systems, the primary is usually mounted on the undercarriage of the vehicle, with the secondary being positioned at intermittent locations or is continuous along the track. This configuration is expensive and complex since each vehicle must be outfitted with the circuitry to generate the electric field and possibly a motor to generate the necessary electrical power.

Alternatively, some transit systems utilize a stationary primary positioned at intermittent locations or continuous along the track with the secondary coupled to the undercarriage of the vehicle and oriented in close proximity with the primary.

In both configurations a small air gap between the primary and secondary is required to position the secondary in the high flux region of the electric field established by the primary. This field generates a current along the secondary which results in a thrust exerted thereon. The magnitude of this thrust is dependent on the size of the air gap between the primary and the secondary and, when transmitted to the vehicle results in the propulsion of the vehicle along the track.

The generation of thrust in the secondary also depends on the alignment of the primary with the secondary, which presents certain difficulties in conventional linear induction propelled vehicles when such vehicles attempt to negotiate a curve. For example, in the case of the vehicle-mounted secondary, the alignment between the primary and the secondary is altered as the vehicle rounds the corner since the secondary cuts the curve defined by the primary. This "chording" effect results in a reduced thrust being delivered to the vehicle and therefore reduces the vehicle's power capability when negotiating the corner.

Reduced power capacity of the vehicle also occurs when the vehicle attempts to climb a grade wherein the transition from a flat to a curved track results in an increased air gap of the primary and the secondary. This results in the secondary being removed from the high flux region of the primary's electric field, therefore reducing the thrust delivered to the vehicle. Therefore conventional induction propelled vehicles are limited to travel along lower grades.

A particular problem is also encountered when a train of vehicles, equipped with a separate secondary element positioned beneath the undercarriage of each vehicle, travels along a track and encounters primary elements spaced along the track. As each vehicle passes over a primary element, a thrust impulse is sent through the train so that a series of pulses are generated as each separate secondary element encounters the primary. This not only causes a poor quality ride but also increases the likelihood of structural failure in the coupling mechanism and results in increased power factor for any wayside power distribution systems associated with the vehicles due to the resulting intermittent peak loads. Accordingly, the superstructure of conventional linear induction propelled vehicles must be upgraded to be able to withstand the fluctuations over long operating periods.

In some LIM systems, attempts are made to increase the thrust capability by projecting the secondary beyond the ends of the vehicle chassis so that a greater length of secondary is in the flux path of the primary. However, the track on which a vehicle so equipped is to operate must be designed carefully to prevent the secondary from gouging the primary when travelling from one grade to the other.

It is therefore an object of the present invention to obviate or mitigate the above-mentioned disadvantages by providing a novel form of transit system.

Broadly stated, the invention comprises a transit system to be propelled by a linear induction motor, including a primary and a secondary, said transit system comprising:
a guideway,
said primary being located at spaced intervals along said guideway,
a train of cars to travel along said guideway; and
linear induction motor drive means to propel said train along said guideway, including primary means disposed along said guideway and a secondary means mounted on said train, said secondary means extending substantially the entire length of said train in a substantially continuous manner for an improved distribution of thrust throughout said train.

Further features, objects and advantages of the present invention will become evident following the detailed description of several embodiments of the present invention, given by way of example only, as seen in the appended drawings in which:

FIG. 11b is a partly sectioned fragmentary side view taken on line 11b—11b of FIG. 11a.

FIG. 15 is a plan view of a portion of the vehicle illustrated in FIG. 11a.

FIG. 17b is a side view of another component of the vehicle illustrated in FIG. 11a.

Figure 1:
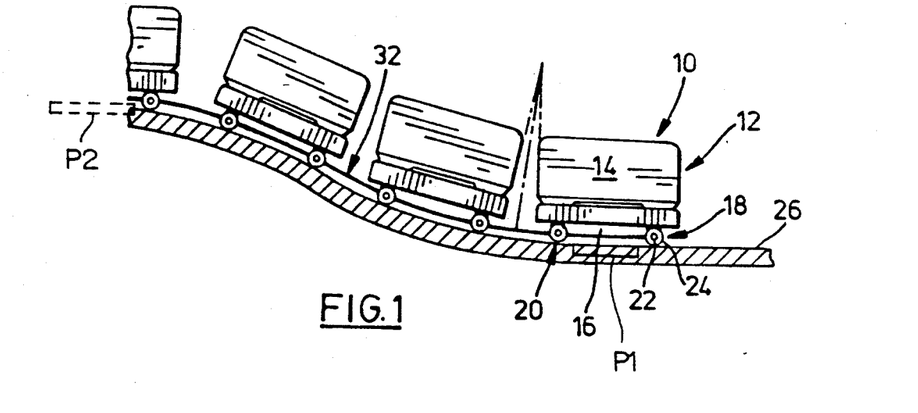
FIG. 1 is a side view of a linear induction propelled train.
Figure 2:
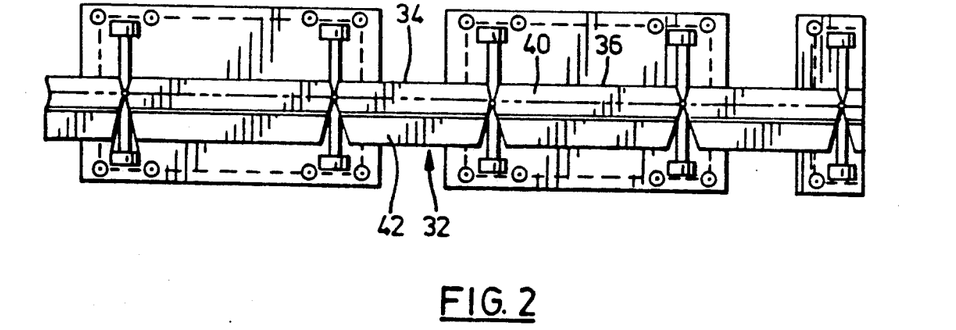
FIG. 2 is an upward view of the train shown in FIG. 1.

Referring to FIG. 1, a portion of a train is shown at 10, including four cars 12, each of which carries a load identified at 14. Each of the cars 12 has a chassis 16 supporting a pair of front and rear rotatable wheel sets 18, 20 respectively with axles 22 mounted to chassis 16. Rotatably on axles 22 are wheels 24 riding along the track atop a pair of rails, one of which is identified at 26.

Figures 3, 4:
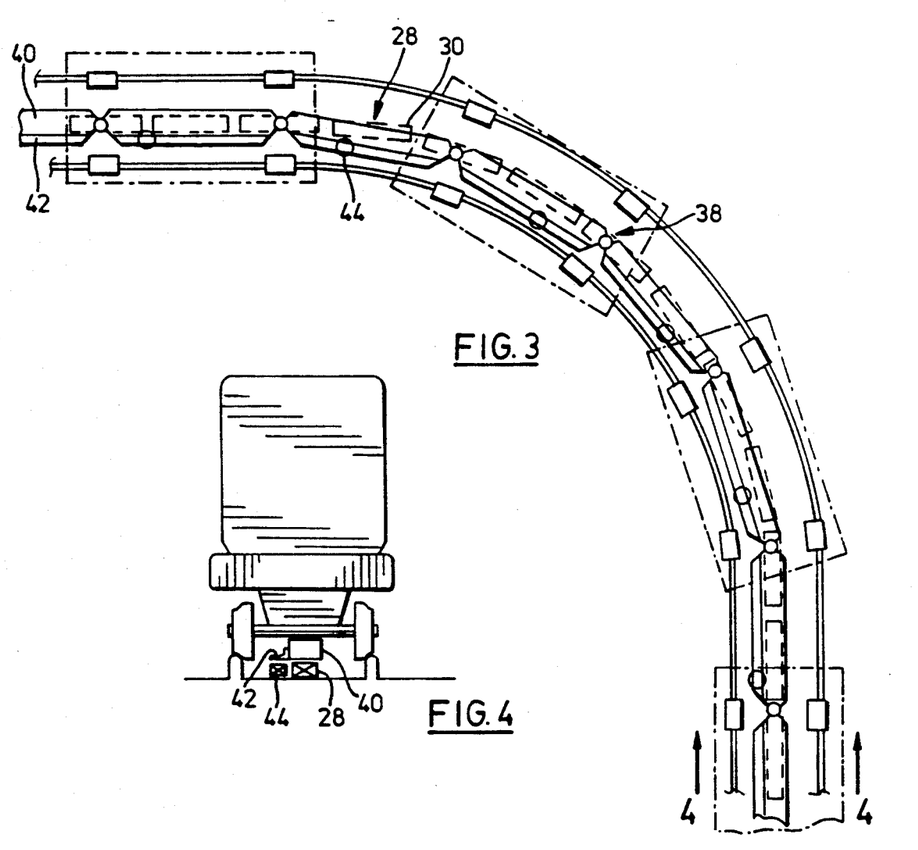
FIG. 3 is a downward schematic view of the train shown in FIG. 1 in a different configuration.
FIG. 4 is an end view taken on line 4—4 in FIG. 3.

Located between the rails is the primary of a linear induction motor, shown at 28 in FIGS. 3 and 4, formed from a plurality of primary elements 30 which extend the length of the track and are positioned in the central region thereof.

Supported on the car and positioned in close proximity to the primary is a segmented reaction member, shown at 32 in FIGS. 1 through 4 which extends beneath and between each of the cars 12. The secondary 32 is formed from two portions, namely a coupling portion 34 positioned between adjacent cars 12, and a frame portion 36 extending along and coupled to the chassis 16 of the car 12, with universal joints 38 joining the abutting ends of the frame and coupling portions.

Each of the coupling and frame portions 34, 36 respectively includes a secondary element 40 to encounter the electric field of the primary 28 and subsequently to generate thrust. Coupled with the secondary element 40 is a sensing rail 42 which has a series of spaced magnetic strips which pass above a number of Hall effect sensors unit 44 positioned at spaced intervals alongside the primary element, as is shown in FIG. 3.

Figure 5:
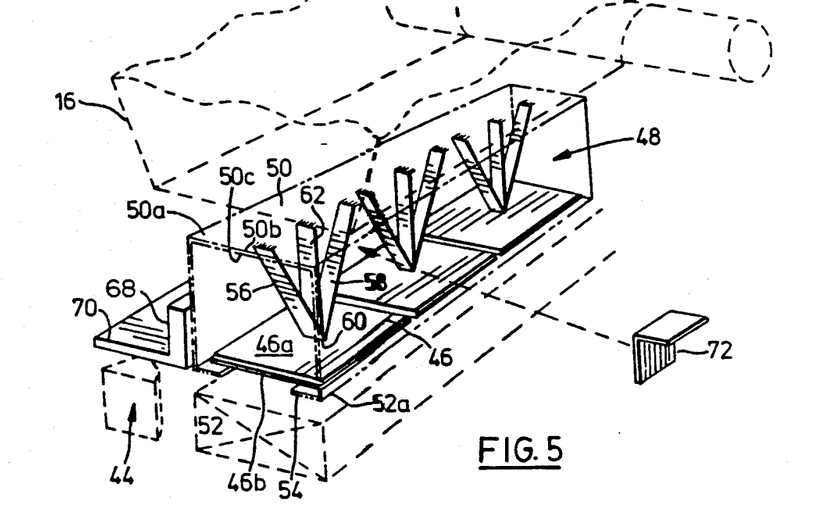
FIG. 5 is a schematic perspective view of a portion of the train shown in FIG. 1.

A particular feature of the secondary element 40 is its composite nature as is shown in FIG. 5. The secondary element 40 is assembled from a series of coplanar conducting plates 46, each having upper and lower bonded layers 46a and 46b respectively, which are constrained against movement within a support structure 48. The conducting plates 46 are also spaced from one another at a small distance to allow for thermal expansion.

The spacing between the conducting plates 46 will depend on the amount of heat being generated by the secondary, as well as the length of the plates 46.

The upper layer 46a is formed from a ferro-magnetic material, which provides a rigid base for weldable connection to the support structure as will be described. The lower layer 46b is formed from an electrically conductive non-magnetic material of a resistive thickness determined by propulsion performance requirements. Such a material could be aluminum, or copper, etc.

The support structure includes an elongate top wall 50 with longitudinal edges 50a and upper and lower surfaces 50b, 50c respectively. Depending from the edges 50 are side walls 52 having lower edges 52a. Inwardly extending from the bottom edge 52a of each of the side walls 52, is a flange 54 which engages the lower surface 46a of the conducting plates 46.

The conducting plates 46 are constrained against lateral displacement by the side walls 52, while longitudinal and vertical displacement of the plates is constrained by the flanges 54 and a set of struts spanning the space between the conducting plates and the top wall. This set of struts includes a pair of bifurcated struts 56, 58 commonly welded to the upper layer 46a of each of the respective conducting plates 46 along a common line of contact shown at 60. The pair of struts upwardly diverge to spaced locations in the central region of the lower surface 50c of elongate top wall 50. A third strut 62 is interposed between each of the respective pairs of struts 56, 58 and is oriented substantially perpendicular to the planes defined by the elongate top wall 50 and the conducting plates 46. A number of straps 72 are provided at spaced locations to attach the secondary element 40 to the chassis 16.

Figure 20:
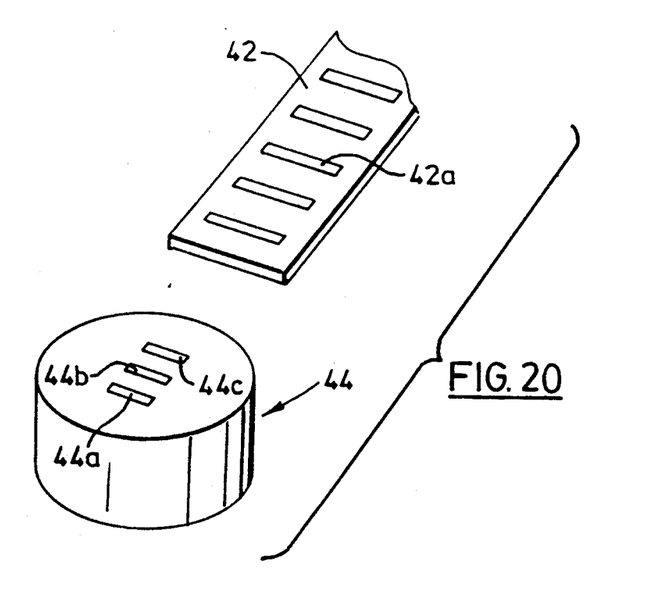
FIG. 20 is a magnetary perspective view of another component of the vehicle illustrated in FIG. 1.

Coupled to side wall 52 of the secondary element 40, is sensing rail 42 which is oriented in close proximity with Hall effect sensing unit 44. The sensing rail has a vertically oriented stiffening flange 68 attached to side wall 52 and a horizontally oriented flange 70 laterally outwardly extending from the vertical flange 68 to be positioned in close proximity with Hall effect sensor unit 44. Referring to FIG. 20, it is seen that the Hall effect sensor unit has three hall effect sensors 44a, 44b, 44c which are arranged along the path of the sensing rail. In addition, the sensing rail 42 has a number of longitudinally spaced magnetic strips 42a which pass over the sensor unit 44.

This configuration allows a signal to be generated from the Hall effect sensors which indicates not only the direction of travel of the vehicle, but also the speed thereof.

In this configuration, the secondary element 40 provides a large air space for cooling during operation of the vehicle, during which time thrust is delivered from the conducting plates 46 to the chassis 16 by way of struts 56 and 58.

Figure 8:
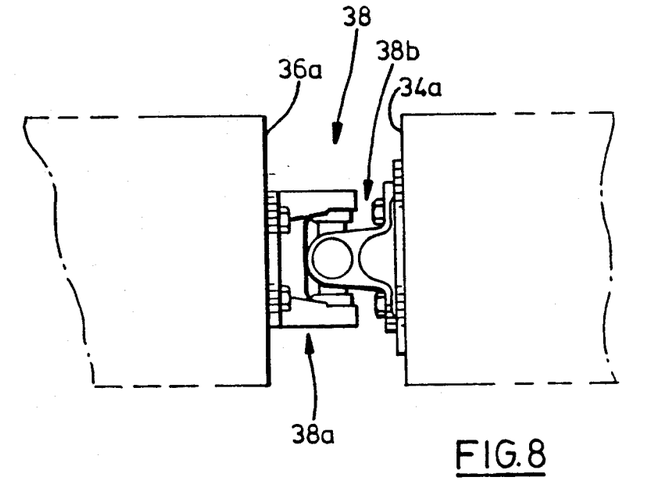
FIG. 8 is a perspective view of another portion of the train illustrated in FIG. 1.

Connection of the cars is provided by way of a conventional universal joint 38 which is illustrated in FIG. 8 to join each frame portion 36 with an adjacent coupling portion. The joint 38 has a pair of coupling brackets 38a, 38b which are attached to end plates 34a, 36a disposed on the respective frame and coupling portions 34, 36.

Thus, segmented reaction element 32 provides a simplified vehicle construction by serving the first function of providing a secondary which spans the undercarriages 16 to distribute thrust impulses thereto and the second function of joining the cars 12 together. In addition, the interconnecting frame and coupling portions forming segmented reaction element 32 enables the train to be lengthened or shortened in any manner, while maintaining the continuity of the reaction element 32.

When assembling the vehicle, the respective frame and coupling portions 34, 36 are joined at a number of universal joints 38. It will be seen that the universal joint permits pivotal movement about vertical and transverse axes while preventing pivotal movement about a longitudinal axis. This is important to maintain alignment of the reaction and coupling portions 34, 36 with the primaries. This results in a near continuous composite reaction element 32 providing a continuous secondary to generate thrust as a result of the field emanating from the primary 28.

During operation of the train, power is supplied to the windings of the primary 28, which generate an electric field extending along the length of the primary 28, and thus cause a thrust to be exerted in the adjacently aligned secondary 40.

The effectiveness of the thrust transfer to the secondary element depends on the proximity and the alignment of the secondary 40 with the primary 28, known as the air gap. A suitable thrust transfer has been found to occur at an air gap ranging from 4 to 10 millimeters. The resulting thrust is then distributed along the reaction element supporting structure 48 and to the undercarriage 16 via straps 72, thereby resulting in displacement of the train.

When the train encounters a hill having a radius in the order of 100 meters as illustrated in FIG. 1, each of the cars successively passes through a transition region wherein the track enters its upward slope.

A primary element is typically located near each end of the transition as illustrated in FIG. 1 at 30a and 30b. To operate the train 10, the maximum spacing between the primaries must be less than the total length of the secondary. In this manner, the secondary will remain in the flux path of at least one primary during the transition, so that thrust can be maintained to move the train 10 up the grade. Furthermore, the continuous nature of the secondary ensures that an even thrust is distributed to each of the vehicles in the train.

In this manner, the continuous segmented reaction element provides the train with an even distribution of forces and a substantial reduction in thrust fluctuations as each of the cars successively encounters the transition region, thereby reducing the localized stresses normally encountered in a discontinuous reaction rail.

Moreover, the overall length of the segmented reaction element provides a secondary which is approximately equal to the length of the train of vehicles. This results not only in an increased power capability delivered to the train, but also in the ability to decrease the number of primaries by increasing their spacing. Thus, the provision of a continuous reaction element permits an infinite range of primary element spacings along the track, to a maximum spacing corresponding to the length of the train.

It is to be noted that there is no risk that the coupling portion of the secondary projecting beyond the chassis 16 from gouging the primary under normal operating conditions since the coupling portion is articulated near the end of the chassis 16. At the same time, however, the same increase in thrust provided by a projecting secondary is still achieved.

When encountering a corner as is shown in FIG. 3, the curvature thereof causes misalignment of each primary element in the corner with the respective secondary element passing thereover which reduces the thrust delivered to the secondary element. However, the loss of power due to a small radius corner is minimized since the cumulative length of the secondary is enlarged by the coupling portions, which reduces the "chording" effect and maintains a sufficient coverage of the primary by the secondary.

Figure 6:
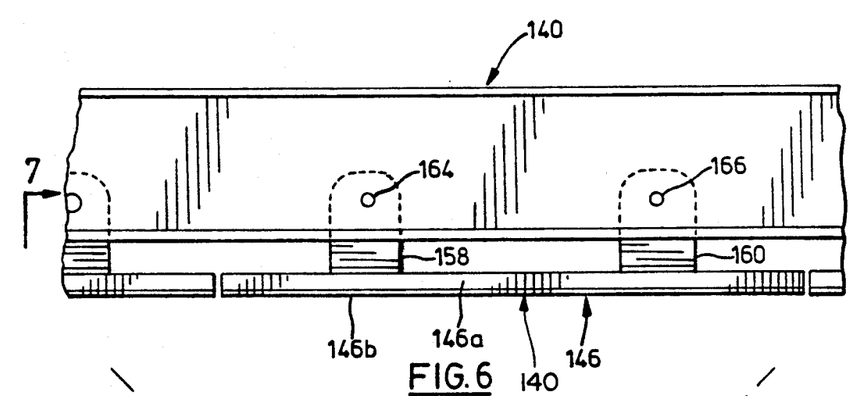
FIG. 6 is a side view of an alternative embodiment of the portion illustrated in FIG. 5.
Figure 7:
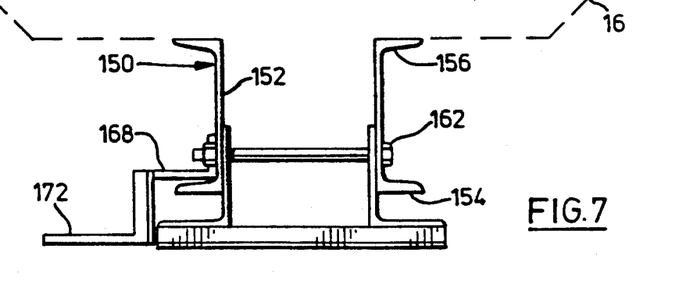
FIG. 7 is an end view taken on arrow 7 in FIG. 6.

An alternative embodiment is shown in FIGS. 6 and 7, wherein the secondary element 140 comprises a series of coplanar conductive plates 146, each of which being formed from an upper layer 146a of a ferro-magnetic material and bonded thereto, a lower layer of a highly conductive material such as aluminum or copper. The conducting plates 146 are coupled to a pair of flanged plate members 150. Each of the plate members 150 has a central web 152 spanning an upper flange 156 and a lower flange 154, the upper flange 156 being coupled to chassis 16. Each of the conductive plates 146 are mounted on the webs 152 by way of two pairs of brackets 158, 160, welded to upper steel layer 146a, and a pair of bolts 162 which respectively pass through two pairs of holes 164, 166 respectively. Holes 166 each have a diameter which corresponds closely with the bolt, while the holes 164 have a wide tolerance in the direction of the longitudinal axis to permit relative sliding of the bolt 152 therein, thereby allowing for thermal expansion. Also attached to each of the bolts is a cantilevered sensing rail support 168 which is coupled to a sensing rail 172.

Thus, it will be seen that the integrity of either the secondary elements 40, 140 enables them to be incorporated as a major structural component of the vehicle chassis 16, thereby simplifying the chassis design.

Figure 9A:
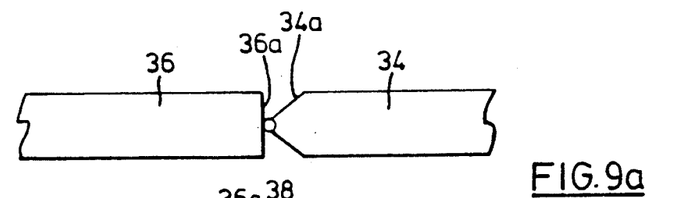
FIGS. 9a, 9b and 9c are schematic representations of embodiments of the component illustrated in FIG. 8.
Figure 9B:
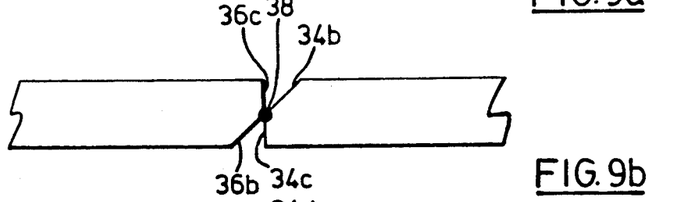
Figure 9C:
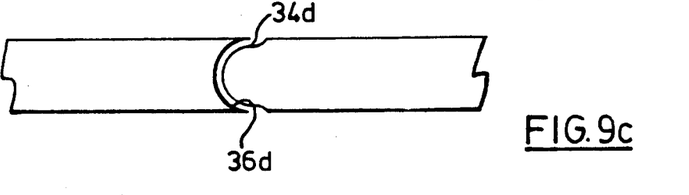

Alternatives are contemplated for the joint configuration as are demonstrated in FIG. 9, wherein FIG. 9a shows the tapering of coupling portion 34 of the reaction element to form tapered portion 34a while forming a perpendicular edge 36a on the frame portion 36. FIG. 9b illustrates the tapering of the side walls 34b, 36b of the abutting portions on alternative sides of the universal joint 38 while forming a perpendicular edge on the other alternative sides 34c, 36c of the universal joint. FIG. 9c illustrates the joining of mating convex and concave surfaces 34d, 36d formed in coupling and frame portions 34, 36 of abutting portions. In either of the joint configurations, relative movement between abutting portions is provided with respect to pitch and yaw axis as in the previous embodiment.

Figure 10:
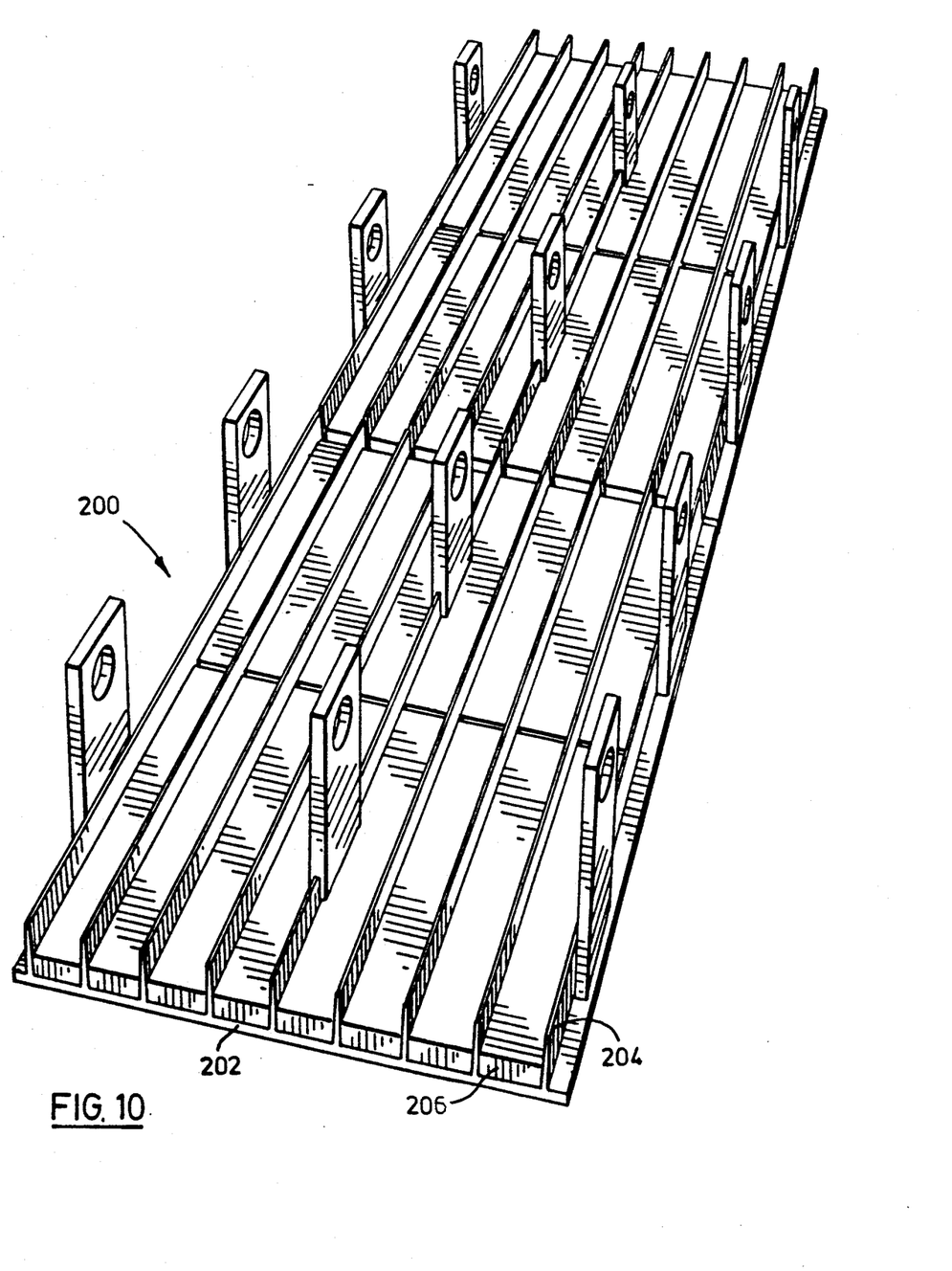
FIG. 10 is a perspective view of an alternative embodiment of the portion illustrated in FIG. 5.

FIG. 10 illustrates a further alternative to the reaction element identified at 200 which has a base of a thermally and electrically conductive non ferromagnetic material such as aluminum with upwardly directed vanes 204 integrally formed with a base 202 by way of an aluminum extrusion process. Located between the vanes 204 are ferro-magnetic elements 206. As well, a number of brackets 208 permit the reaction element to be attached to a vehicle frame. This embodiment is particularly suited to applications where a high degree of heat is generated in the secondary, as the vanes 204 increase the effective surface area of the reaction element, to transfer heat to an air flow passing over the vanes 204 thereby increasing the cooling efficiency of the reaction element.

Figure 11A:
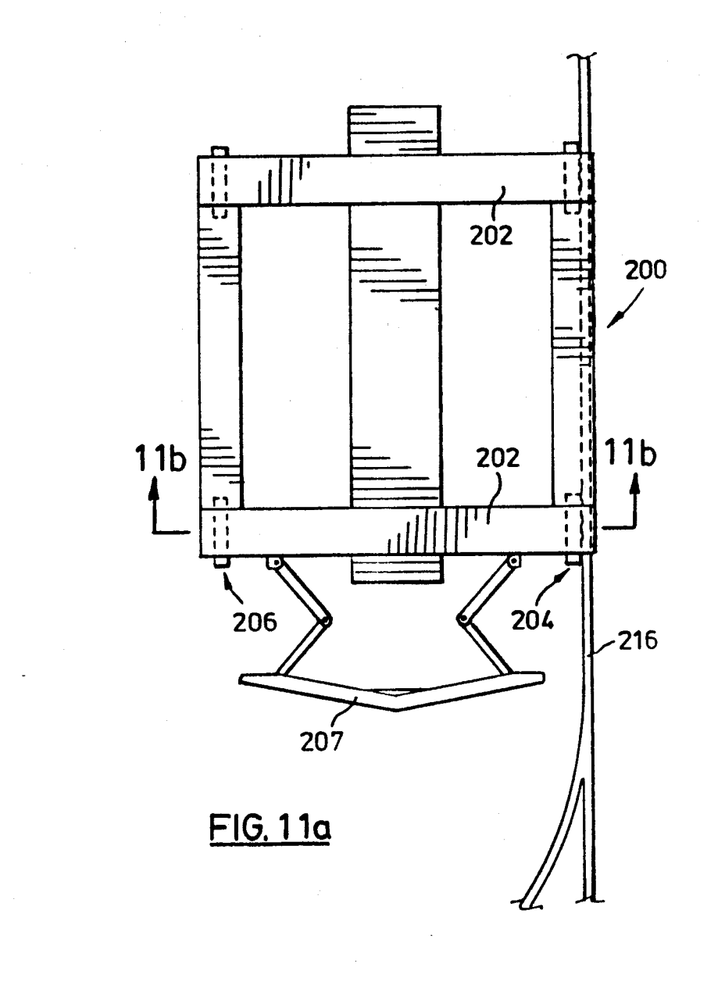
FIG. 11a is a plan view of a portion of an alternative vehicle assembly.

An alternative vehicle is identified at 200 in FIG. 11a and is described in detail in FIGS. 11a to 17b. The vehicle 200 has a frame including a pair of transverse beams 202 which support a pair of drive wheel assemblies 204 associated with a track 216 and a pair of follower wheel assemblies 206.

The drive wheel assembly 204 includes a load wheel 212 rotatably supported in a housing 213 which in turn is mounted to the transverse beam 204 by way of a bearing mechanism 208 for rotation about a vertical axis. The housing 213 includes a vertical flange 213a, to which a guide wheel 214 is attached for rotation about a vertical axis. Mounted on the side of the housing 213 is a braking assembly 215 as will be described in detail herein below.

Figure 11B:
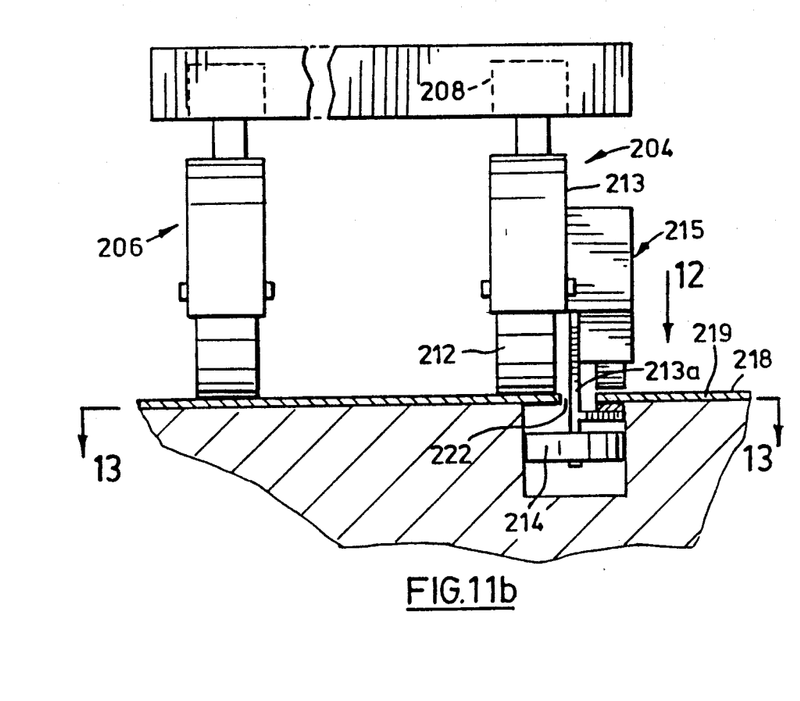

A particular feature of the vehicle 200 is the track 216 which includes a channel 220 formed below a floor member 219 defining a floor surface 218. The track 216 is outwardly defined by a gap 222 through which the flange 213a extends and enables the guide wheel 214 to travel along the walls of the channel 220 so as to guide the vehicle.

Figure 12:
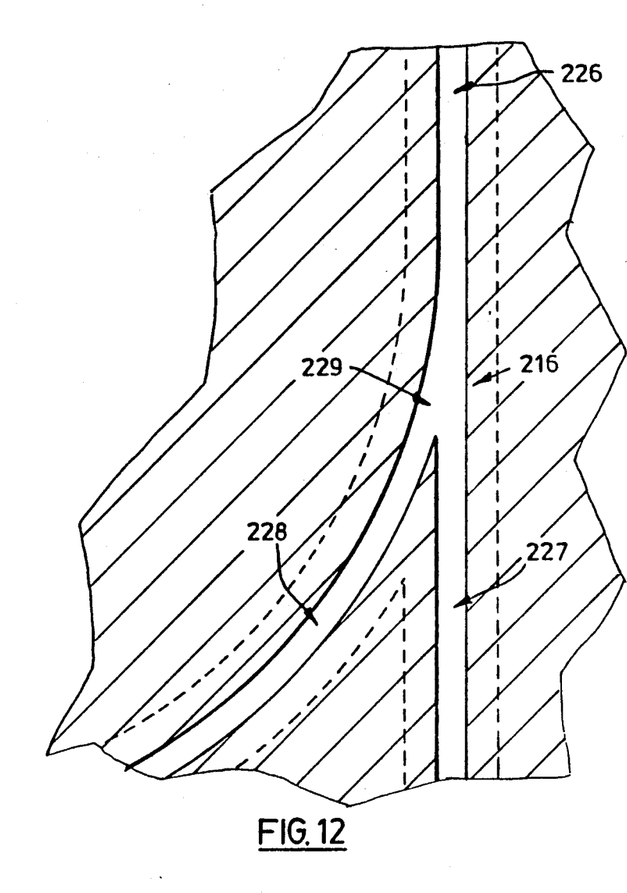
FIG. 12 is a plan view of a portion of the assembly illustrated in FIG. 11.

Referring to FIG. 12, the track includes a pair of linear track segments 226, 227 and a curved track segment 228 which join at an intersection identified at 229. Disposed within the intersection 229 is a switch assembly 230 shown in FIG. 13, which includes a pair of plate members 232, 234 which are fixably mounted to adjacent channel walls of the track segments 227, 228 and mounted at one end by anchor pins 236, 238 respectively. Also provided is an actuation assembly 240 which includes a pneumatic cylinder 242 disposed within a cylinder cavity 244 within the floor structure. Driving the pneumatic cylinder 242 is a pneumatic valve unit 246, which in turn is connected to a pneumatic supply not shown.

Figure 13:
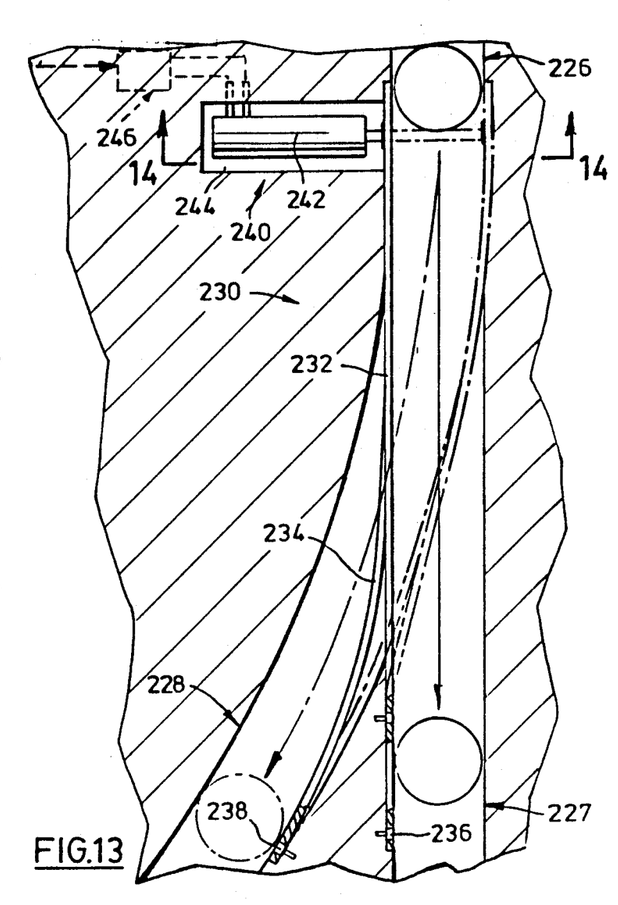
FIG. 13 is a plan view taken on line 13—13 of FIG. 11b.

As shown in FIG. 13, the first plate member in effect joins linear track segments 226, 227 together while closing access to the curved track segment 228. However, upon actuation of the cylinder, the plate members 232, 234 are displaced to a position as shown in dashed lines in FIG. 13, thereby linking linear track segment 226 to the curved track segment 228.

Figure 14:
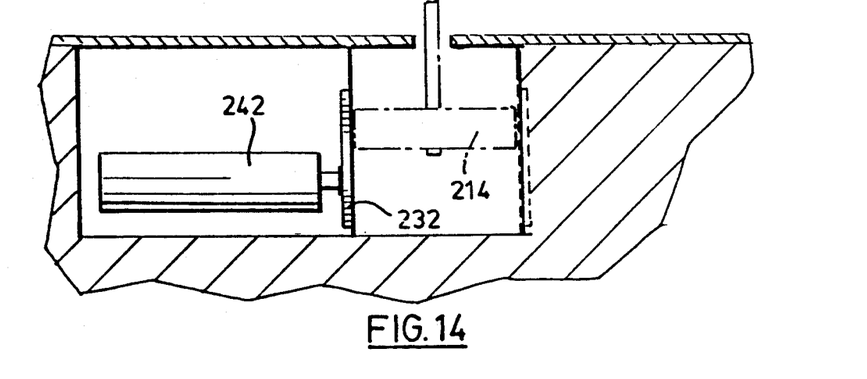
FIG. 14 is a sectional side view taken on line 14—14 of FIG. 13.
Figure 15:
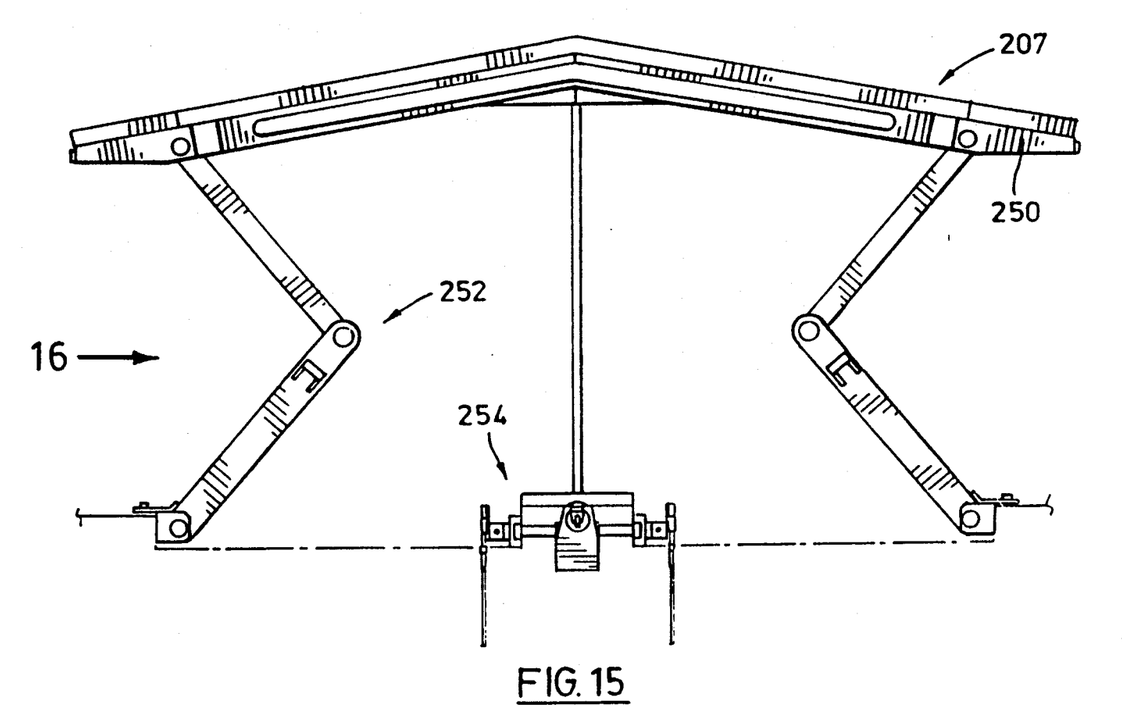

As is shown in FIG. 14, the guide wheel 214 travels along the periphery of the channel, as is defined on one side by the first plate member 232. Thus, in its unactuated position, the first plate member 232 causes the follower wheel to direct the vehicle along the track segments 226, 227. However, when in its actuated position, the guide wheel travels along the opposite surface of the first plate member 232, thereby causing the vehicle to follow the curve of the track from track segment 226 to track segment 228.

It is to be noted that, although not shown, the vehicle is provided with a steering mechanism whereby the follower wheel assemblies 206 are rotated about a vertical axis relative to the transverse beam in accordance with the corresponding rotation of the respective drive wheel assemblies 204 as it follows the curve of the track between track segment 226, 228.

Referring now to FIGS. 15 to 17b, the bumper assembly 207 includes an abutment means in the form of a bumper beam 250 which is mounted to transverse beam 202 and movable with respect thereto by way of outwardly biased lever mechanisms 252. The bumper assembly 207 is also provided with an actuation means in the form of a trip mechanism 254 to activate the brake assembly 215 upon displacement of the bumper beam 250. The trip mechanism 254 includes an actuating rod 256 which is aligned with a latch 258 downwardly extending from and pivotally mounted to a support assembly 259. Disposed at each end of the support assembly is a bell crank member 260 which has a pair of connecting cables 262, 263 mounted in over-centre relationship relative to the pivot axis of the latch 258.

Figure 17A:
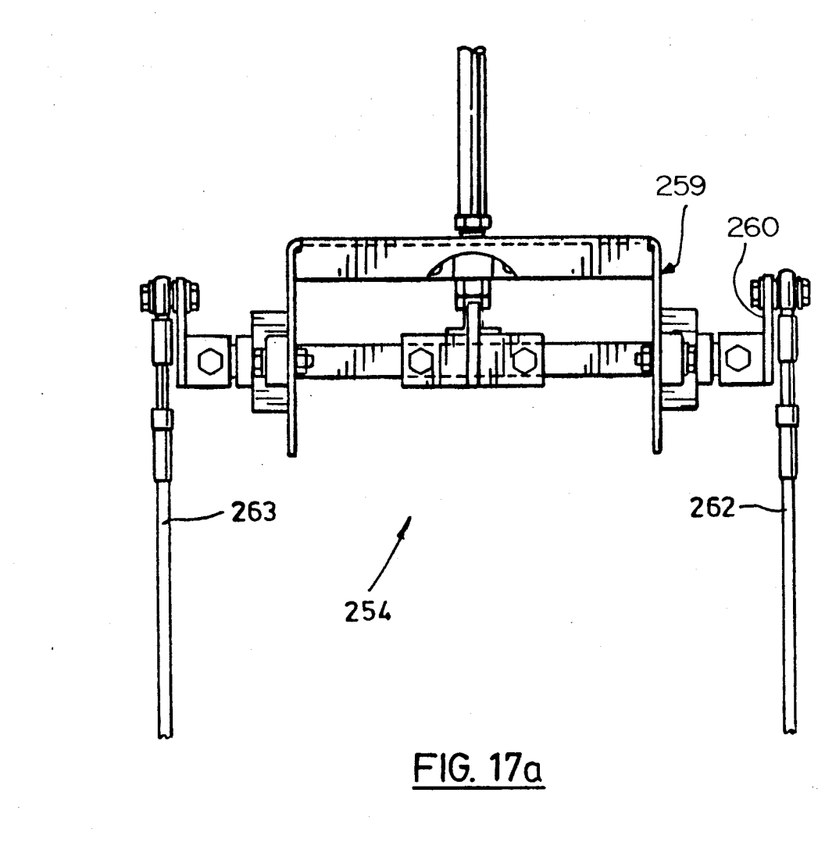
FIG. 17a is a plan view in an enlarged scale of a component illustrated in FIG. 15.
Figure 17B:
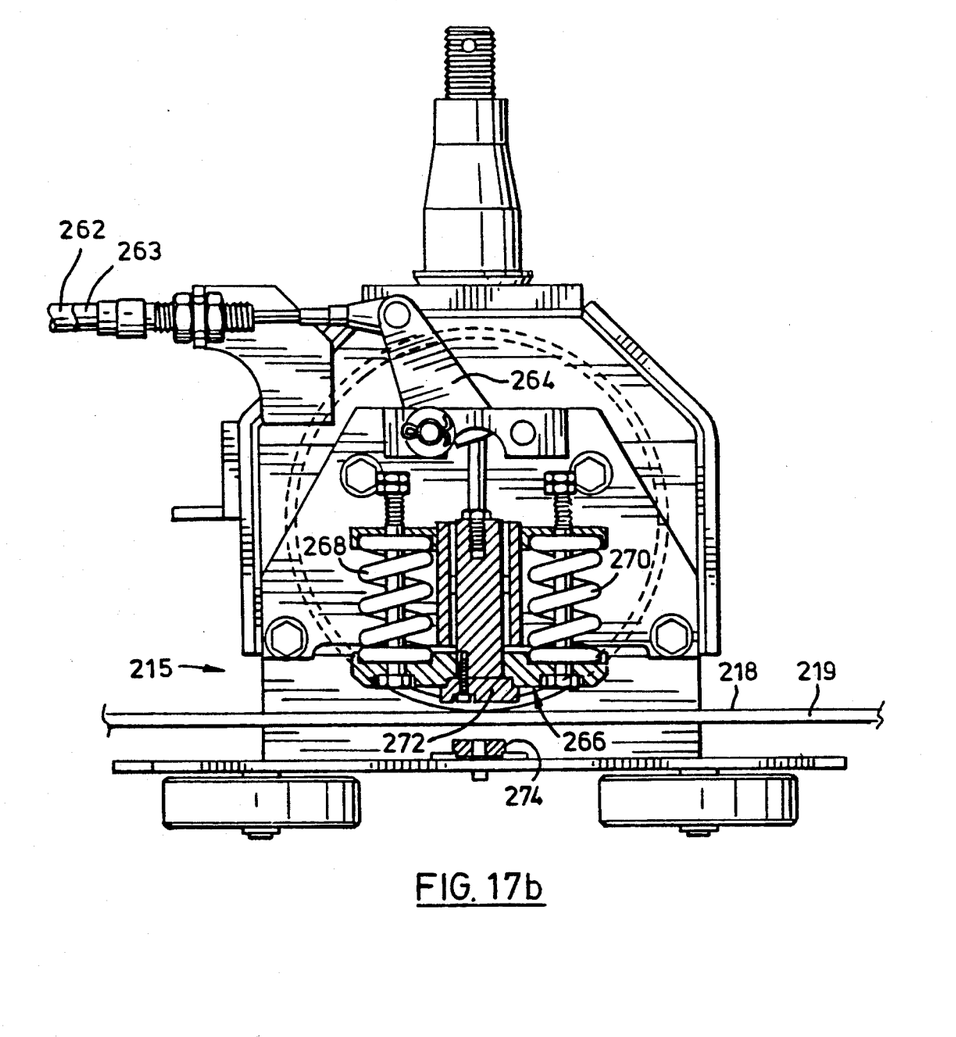

Referring to FIG. 17b, the connecting cables 262, 263 are joined to the front and rear drive wheel assemblies at the braking assembly 215. Coupled with the connecting cables 262, 263 is an actuating lever 264 which in turn is coupled to a support assembly 266 which is biased toward the floor surface 218 by way of compression springs 268, 270. Disposed at the lower end of the support assembly 266 is a brake pad 272 which is disposed adjacent the floor surface 218 so as to establish a frictional force therewith upon actuation of the lever 264.

Figure 16:
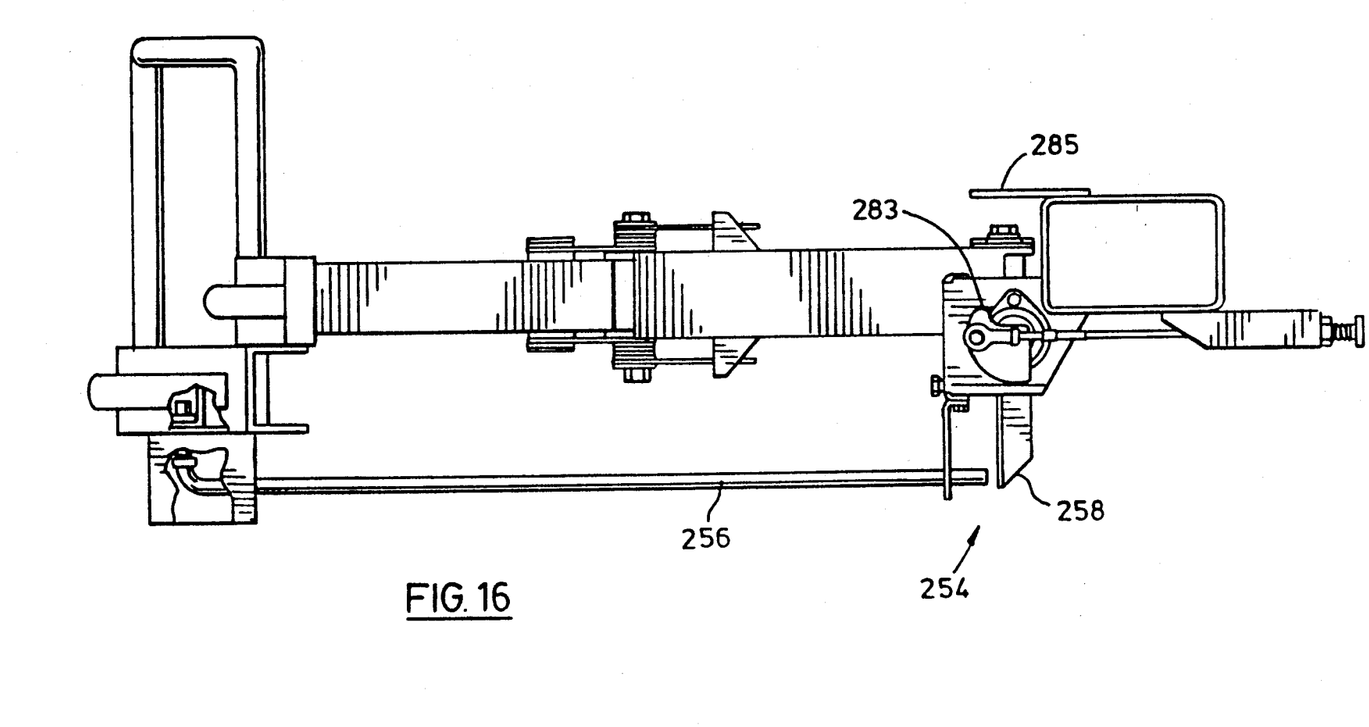
FIG. 16 is a side view taken on arrow 16 in FIG. 15.

In operation, the bumper beam 250 is displaced upon contact with an obstacle, thereby causing the actuating rod 256 to engage the latch 258. As the latch 258 is initially rotated in counter-clockwise fashion as seen in FIG. 16, the pivot point of the connecting cables 262, 263 therewith pass from their over-centre resting position beyond the horizontal elevation of the pivot point of the latch 258. This causes a counter-clockwise moment to be applied to the support assembly 259, thereby causing the connecting cables 262, 263 to release the respective actuating lever 264 in the drive wheel assemblies 204. This causes the support assembly 266 to be displaced downwardly to an operative position where the brake pad 272 contacts the floor member 219. By virtue of the spring rate of the compression springs 268, 270, the wheel assembly is displaced slightly upwardly so as to engage an additional brake pad, identified at 274, with the floor member 219, thereby stopping the vehicle.

Figure 18:
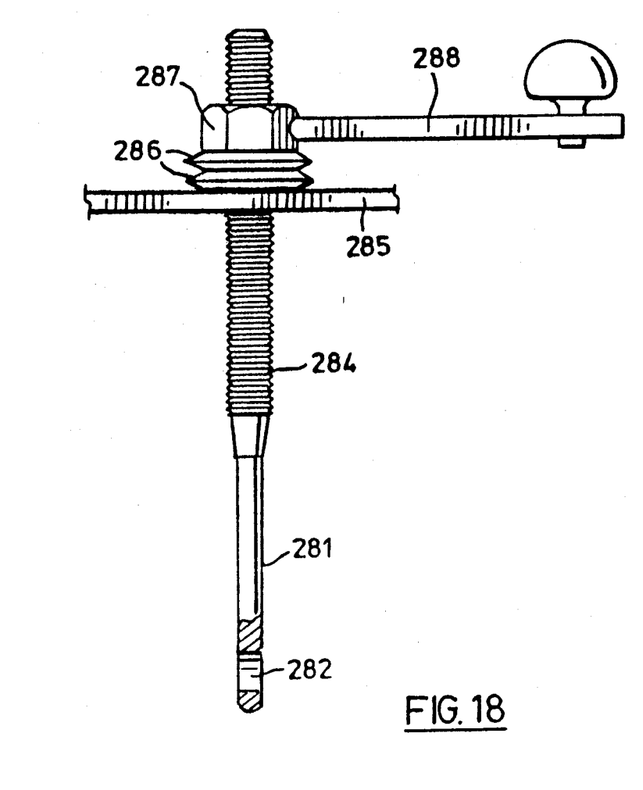
FIG. 18 is a side view of a device to be used in association with a component illustrated in FIG. 16.

When the brake is to be released, a release device 280 illustrated in FIG. 18, is used. The device has an engagement member 281 with an aperature at 282 to engage a lip identified at 283 in FIG. 16. A threaded portion 284 is inserted through an aperture in a brace member 285. A pair of washers 286 and a nut 287 are disposed about the threaded portion 284 while a crank member 288 is attached to the wall of the nut. The lip 283 may be engaged and rotated clockwise, as viewed in FIG. 16 so as to realign the latch 258 with the actuating rod 256.

Figure 19:
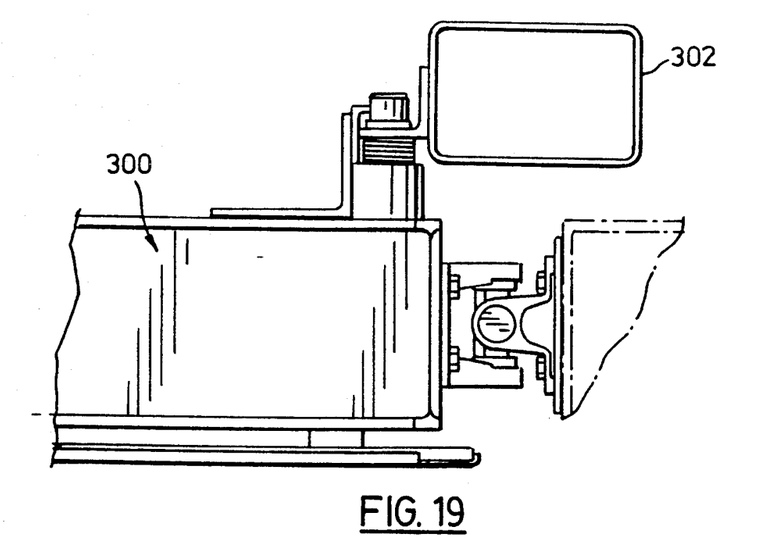
FIG. 19 is a side view of an alternative to the portion illustrated in FIG. 5.

FIG. 19 illustrates a further alternative construction of a reaction element 300 and the same with a frame member 302 of a vehicle by way of a pair of angular members joined by a bolt assembly.

We claim:

1. A transit system comprising:
   a guideway;
   a train of cars to travel along said guideway; and
   linear induction motor drive means to propel said train along said guideway, including primary means disposed along said guideway and a secondary means mounted on said train, said secondary means being articulated and extending the entire length of said train in a substantially continuous manner whereby said secondary means is moveable with respect to said train during movement of said train over a curve in said guideway to maintain substantially disposition of said secondary means over said primary means thereby to improve distribution of thrust throughout said train.

2. A transit system as defined in claim 1 wherein said secondary means is segmented into a plurality of secondary elements.

3. A transit system as defined in claim 1 wherein said primary means is formed from a plurality of spaced primary elements.

4. A transit system as defined in claim 1 wherein said secondary means is segmented to define a set of first portions, each of which is disposed beneath a respective one of said cars and a set of second portions, each of which is located between a respective pair of said cars.

5. A transit system as defined in claim 4, further comprising pivot means joining respective ones of said first and second portions to accommodate movement of said secondary means during movement of said train over horizontal and vertical curves in said guideway.

6. A transit system as defined in claim 4 wherein said second portions have a structural integrity so as to serve as coupling members between adjacent cars, while said first portions have a structural integrity to constitute frame members of said respective cars.

7. A transit system as defined in claim 4 wherein said first and second portions include:
   a rigid elongate support structure;

a plurality of conductive elements in spaced coplanar relation, each of said conductive elements being connectable with said support structure for spaced alignment with said primary; and connection means to connect said conductive elements with said support structure such that said thrust is transferred from said conductive elements to said support structure.

8. A transit system as defined in claim 6, wherein said secondary element further includes coupling means to couple said first portions with the chassis of said respective cars.

9. A transit system as defined in claim 7 wherein said connection means includes a first set of pivotal connections, each near one end of a respective conductive element, and a second set of slidable pivotal connections, each near the other end of said respective conductive element.

10. A transit system as defined in claim 7 wherein said conductive elements are formed from a pair of layers of material, one of said layers being conductive and oriented to lie in face to face relation with said primary element.

11. A transit system as defined in claim 7, wherein said support structure includes guide means to engage the longitudinal edges of said conductive elements.

12. A transit system as defined in claim 11, wherein said support structure has an upper elongate plate member and a pair of webs depending from the longitudinal edges thereof, said guide means being defined by a pair of flanges inwardly extending from the lower edge of each of said webs.

13. A transit system as defined in claim 12, wherein said connection means further includes a set of first strut members, a pair of which extend between said plate member and one of said conductive elements.

14. A transit system as defined in claim 13, wherein said first struts are joined to said conductive elements in a central region thereof and are joined to said plate member at spaced locations along a longitudinal axis thereof.

15. A transit system as defined in claim 14, wherein said connection means further includes a set of second strut members each of which is substantially perpendicular with respect to and joins said plate member with one conductive element, each of said second strut members being located between said pair of first strut members.

16. A reaction element for a linear induction motor assembly, comprising:
a an elongate support structure for location adjacent a stationary primary element;
a plurality of elongate conductive elements in a spaced coplanar relation, each of said elongate conductive elements being connectable with said support structure for disposition along and in spaced relation to said primary element to encounter a thrust generated by a magnetic field emanating from said primary element; and
connection means to connect said elongate conductive elements with said support structure to transfer said thrust from said elongate conductive elements to said support structure.

17. A reaction element as defined in claim 16 including coupling means disposed at each end of said support structure for pivotal attachment with adjacent reaction elements.

18. A reaction element as defined in claim 17 wherein said coupling means includes a universal joint.

19. A reaction element as defined in claim 16, further including suspension means for coupling said reaction element with a vehicle.

20. A reaction element as defined in claim 16, wherein said connection means includes a first pivotal connection near one end of a respective conductive element and slidable pivotal connection near the other end of said respective conductive element.

21. A reaction element as defined in claim 16, wherein said conductive elements are defined by a pair of layers of material, one of said layers being conductive and oriented to lie in face to face relationship with said primary element.

22. A reaction element as defined in claim 16, wherein each of said conductive elements has a pair of longitudinal edge regions, said support structure including guide means to engage said longitudinal edge regions.

23. A reaction element as defined in claim 22, wherein said support structure has an upper elongate plate member and a pair of webs depending from the longitudinal edges thereof, said guides means being defined by a pair of flanges inwardly extending from the lower edge of each of said webs.

24. A reaction element as defined in claim 23, wherein said connection means further includes a set of first strut members, a pair of which extend between said plate member and one of said conductive elements.

25. A reaction element as defined in claim 24, wherein said first struts are joined to said conductive elements in a central region of said conductive elements, and are joined to said plate member at spaced locations along a longitudinal axis of said plate member.

26. A reaction element as defined in claim 25, wherein said connection means further includes a set of second strut members each substantially perpendicular with respect to and joining said plate member and one conductive element together, each of said second strut members being located between a respective pair of said first strut members.

27. A vehicle for use in a train comprising:
a chassis having a given length;
linear induction motor means including a secondary mounted on said chassis, said secondary including a first portion extending along the length of said chassis and a second portion pivotally attached to one end of said first portion; and
coupling means disposed on a distal end of said second portion for attachment with the first portion of a secondary mounted on the chassis of an adjacent vehicle.

28. A reaction element for a linear induction motor, said reaction element having a base with a surface to face a primary element of said linear induction motor; a number of vanes upwardly extending from said base and spaced from one another, said base and said vanes being formed from thermally and electrically conductive substantially non-ferromagnetic material; a plurality of ferromagnetic elements lying between said vanes, each of said ferromagnetic elements having an outer surface, each one of said elements lying between an adjacent pair of said vanes, said vanes extending beyond said outer surface to define air flow channels for increasing the cooling efficiency of said reaction element.

29. A reaction element as defined in claim 28 wherein said vanes are integrally formed with said base.

* * * * *